United States Patent
Akiho et al.

(10) Patent No.: US 7,261,240 B2
(45) Date of Patent: Aug. 28, 2007

(54) PORTABLE TYPE INFORMATION PROCESSING TERMINAL DEVICE

(75) Inventors: Hiraku Akiho, Miyagi (JP); Akihiro Kikuchi, Chiba (JP); Kazuo Nozawa, Miyagi (JP); Masato Ishigaki, Miyagi (JP); Isao Takahashi, Miyagi (JP); Junichi Sawada, Tokyo (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 11/042,786

(22) Filed: Jan. 25, 2005

(65) Prior Publication Data

US 2005/0178835 A1 Aug. 18, 2005

(30) Foreign Application Priority Data

Jan. 30, 2004 (JP) ............................ P2004-024431

(51) Int. Cl.
*G06K 19/06* (2006.01)

(52) U.S. Cl. .................. 235/492; 235/449; 235/451

(58) Field of Classification Search ................ 235/492, 235/449, 380, 451; 343/702, 741, 764; 455/575.1, 455/575.5

See application file for complete search history.

(56) References Cited

U.S. PATENT DOCUMENTS

| | | | | |
|---|---|---|---|---|
| 5,642,120 A | * | 6/1997 | Fujisawa | ..................... 343/702 |
| 6,371,380 B1 | * | 4/2002 | Tanimura | ..................... 235/492 |
| 6,608,550 B2 | * | 8/2003 | Hayashi et al. | ........... 340/10.34 |
| 6,745,057 B1 | * | 6/2004 | Hankui | ..................... 455/575.5 |
| 7,070,101 B2 | * | 7/2006 | Deguchi et al. | ............. 235/451 |
| 2004/0023701 A1 | * | 2/2004 | Hankui | ..................... 455/575.7 |
| 2004/0266486 A1 | * | 12/2004 | Deguchi et al. | .......... 455/562.1 |

FOREIGN PATENT DOCUMENTS

| | | |
|---|---|---|
| JP | 06-344692 | 12/1994 |
| JP | 07-263936 | 10/1995 |
| JP | 10-162260 | 6/1998 |
| JP | 11-250205 | 9/1999 |
| JP | 11-250207 | 9/1999 |
| JP | 2001-006007 | 1/2001 |
| JP | 2001-024425 | 1/2001 |
| JP | 2001-044747 | 2/2001 |

(Continued)

OTHER PUBLICATIONS

Office Action issued by the Japanese Patent Office on Dec. 26, 2006 for corresponding Japanese application 2004-024431.

(Continued)

*Primary Examiner*—Ahshik Kim
(74) *Attorney, Agent, or Firm*—Bell, Boyd & Lloyd LLP

(57) ABSTRACT

A portable type information processing terminal device is provided which includes a substrate carrying a substantially annular antenna coil thereon, a signal processing integrated circuit element arranged inside the antenna coil, a magnetic plate arranged under the substrate and a metal plate arranged under the magnetic plate, which are integrally formed and arranged on one or more than one metal parts including a battery pack. The metal plate is used to substantially regulate the resonance frequency of the antenna coil so that it is allowed to be arranged in a cabinet of the portable device.

6 Claims, 12 Drawing Sheets

FOREIGN PATENT DOCUMENTS

| | | |
|---|---|---|
| JP | 2001-307051 | 11/2001 |
| JP | 2001-319192 | 11/2001 |
| JP | 2001307032 | 11/2001 |
| JP | 2002-183702 | 6/2002 |
| JP | 2002-279383 | 9/2002 |
| JP | 2003-016409 | 1/2003 |
| JP | 2003-037861 | 2/2003 |
| JP | 2003-046627 | 2/2003 |
| JP | 2003087385 | 3/2003 |
| JP | 2003-099733 | 4/2003 |
| JP | 2003-216899 | 7/2003 |
| WO | 03/105079 | 12/2003 |
| WO | 03/105079 A1 | 12/2003 |

OTHER PUBLICATIONS

Search report issued on Aug. 8, 2006, associated with corresponding Japanese patent application, No. 2004-024431.

* cited by examiner

PORTABLE TYPE INFORMATION PROCESSING TERMINAL DEVICE

BACKGROUND OF THE INVENTION

The present invention relates to a portable type information processing terminal device containing an integrated circuit element of a non-contact communication system such as an RFID (Radio Frequency Identification) system.

So-called RFID systems adapted to use a non-contact type IC card are known in the field of automatic check gates of railway stations, security systems for checking persons going into and out of buildings and electronic money systems and the like.

An RFID system typically includes one or more than one non-contact type IC card and a reader/writer for writing data on, and reading data from, the non-contact type IC card. In the RFID system, the antenna coil of the reader/writer and that of the IC card are magnetically coupled to each other by inductive coupling to allow a non-contact data communication to take place between the IC card and the reader/writer.

Data can be exchanged easily and rapidly in such an RFID system because it is no longer necessary to insert an IC card into a reader/writer or contact an IC card to a metal contact as in the case of conventional contact-type IC card systems. Additionally, electric power is supplied to the non-contact type IC card as the AC magnetic field that is excited by the antenna coil of the reader/writer is applied to the IC card. In other words, the IC card is not required to contain a power source such as a battery in the inside and operates highly reliably so that it needs fairly minimal maintenance services. In a known RFID system, a reader/writer is installed in a portable type information processing terminal device such as PDA (Personal Digital Assistants) and the portable type information processing terminal device is adapted to read data from the non-contact type IC card and update the data (see Patent Document 1: Jpn. Pat. Appln. Laid-Open Publication No. 2001-307032).

Meanwhile, a portable type information processing terminal device such as a PDA or a portable type telephone set is designed so as to be constantly carried by the user when the user goes out. Therefore, if a portable type information processing terminal device is provided with the functional feature of a non-contact type IC card, the user of the portable type information processing terminal device who always carries it does not have to carry any other non-contact type IC card to a great advantage on the part of the user.

However, since portable type information processing terminal devices are compact but multifunctional, metal parts are highly densely mounted in a small cabinet thereof. For example, the printed circuit board such a device has an electrically conductive multilayer structure and electronic parts such as integrated circuit elements which are highly densely mounted on the multilayer printed circuit board. Additionally, such a portable type information processing terminal device contains a battery pack as a power source of the device. The battery pack contains a metal as a material of a frame or the like. Therefore, when an antenna coil is arranged in the cabinet of a portable type information processing terminal device, the resonance frequency of the antenna coil can be remarkably modified under the influence of the metal parts mounted in the cabinet to make it difficult to regulate the resonance frequency of the antenna coil and at the same time, to secure the card voltage for driving at least the signal processing integrated circuit element connected to the antenna coil.

Additionally, if the signal processing integrated circuit element of an RFID system is mounted not on the substrate where the antenna coil is arranged but on the main substrate of the portable type information processing terminal device, the antenna coil and the signal processing integrated circuit element are separated from each other by a long distance. As the antenna coil and the signal processing integrated circuit element are separated from each other by a long distance, the resistance between the antenna coil and the signal processing integrated circuit element rises, which results in a large loss. Furthermore, the performance of the device is degraded in terms of anti-external-noise performance.

As pointed out above, it is not possible for a portable type information processing terminal device to reliably transmit and receive data by simply arranging a non-contact type IC card in the device.

Patent Document 2 (Jpn. Pat. Appln. Laid-Open Publication No. 2003-87385) describes a technique that may appear to resemble the present invention. However, the portable type telephone set described in Patent Document 2 is characterized by arranging an RFID tag on an antenna and, thus, is different from a portable type information processing terminal device according to the present invention in which an RFID tag is contained in a cabinet.

SUMMARY OF THE INVENTION

In view of the above-identified problems, the present invention is directed toward a novel portable type information processing terminal device having the functional feature of a portable type IC card.

The present invention seeks to provide a portable type information processing terminal device of which the resonance frequency of the antenna coil can be substantially regulated with ease.

The present invention also seeks to provide a portable type information processing terminal device that can minimize the influence of the metal parts mounted in the cabinet thereof when it is configured to contain a portable type IC card in the cabinet.

Moreover, the present invention seeks to provide a portable type information processing terminal device that operates excellently in terms of anti-external-noise performance when a portable type IC card is arranged in the cabinet.

A portable type information processing terminal device according to the present invention includes: a substrate carrying a substantially annular antenna coil thereon; a signal processing integrated circuit element arranged inside or near the antenna coil; a magnetic plate arranged on the substrate; and a metal plate arranged on the magnetic plate, with the substrate, the magnetic plate and the metal plate being integrally formed and arranged in a cabinet.

Thus, according to the present invention, it is possible to substantially regulate the resonance frequency of the antenna coil by laying a metal plate on a magnetic plate that is laid on a substrate on which the antenna coil is arranged. Additionally, a portable type information processing terminal device according to the present invention can be downsized and made lightweight as the signal processing integrated circuit element of the device is arranged inside or near the antenna coil. Furthermore, a portable type information processing terminal device according to the present invention can be made very thin as a result of integrally forming the substrate, the magnetic plate and the metal plate.

Additional features and advantages of the present invention are described in, and will be apparent from, the following Detailed Description of the Invention and the Figures.

DETAILED DESCRIPTION OF THE INVENTION

The present invention now will be described in greater detail by referring to the accompanying drawings that illustrate a portable type telephone set achieved through application of the present invention.

Figure 1:
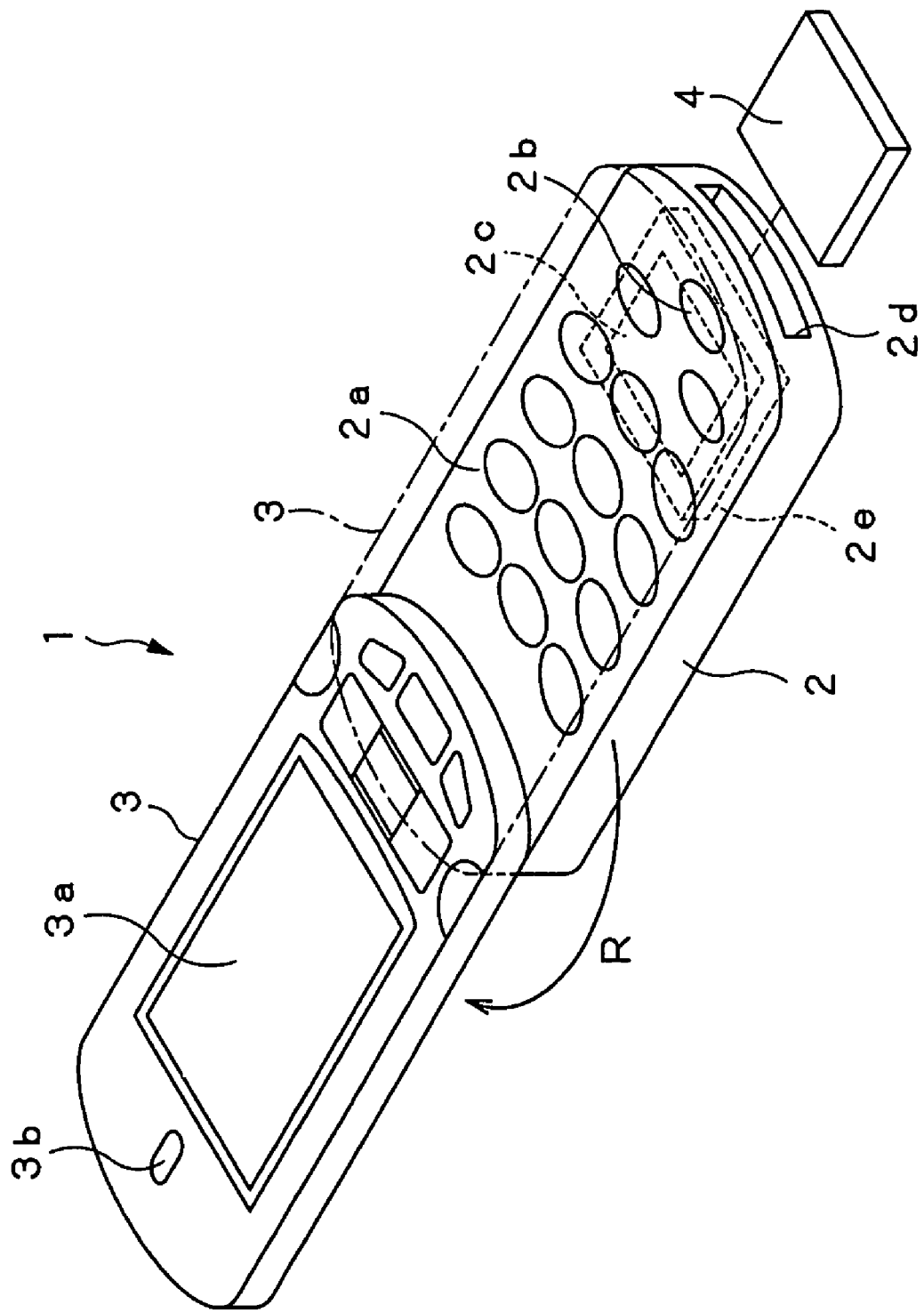
FIG. 1 is a schematic perspective view of a portable telephone set achieved via application of the present invention.

Referring to FIG. 1, the portable type telephone set 1 achieved through application of the present invention includes an equipment main body 2 and a panel section 3 rotatably fitted to the equipment main body 2. The equipment main body 2 has a substantially rectangular profile, an input section 2a including ten keys, a communication button, a power supply button and other push buttons, a microphone 2b for receiving sound as input and transforming the input sound into an electric signal and an RFID section 2c including a transmission/reception section and other sections of an RFID system arranged on one of the main surfaces thereof. The microphone 2b is arranged at an end of the main surface and near the other main surface of the equipment main body 2 at the rear side thereof so that it may be located near the mouth of the user. The RFID section 2c is also arranged at the end of the main surface and hence near the rear side of the equipment main body 2. The equipment main body 2 is provided at the rear side thereof with a battery inlet port 2d through which a battery pack 4 that operates as power source of the portable type telephone set 1 is put in and also with a battery receiving section 2e that is directly connected to the battery inlet port 2d to receive the battery pack 4. The battery pack 4 typically contains a lithium ion secondary battery. The battery pack 4 has, for example, a substantially rectangular profile and is formed by a metal material such as aluminum. As for the position relationship between the battery receiving section 2e and the RFID section 2c, the RFID section 2c is formed on the main surface of the equipment main body 2 that takes the role of operation panel and the battery receiving section 2e is formed on the other main surface to receive the battery pack 4.

The panel section 3 that is fitted to the equipment main body 2 can be turned in the sense of arrow R in FIG. 1. A display section 3a including an LCD (Liquid Crystal Display), an organic EL (ElectroLuminescent) display or some other display and a speaker 3b adapted to transform an electric signal into reproduced sound are arranged on the main surface of the panel section 3 that faces the equipment main body 2. Although not shown, a communication antenna for communicating with a base station is arranged on the front side of the panel section 3.

Figure 2:
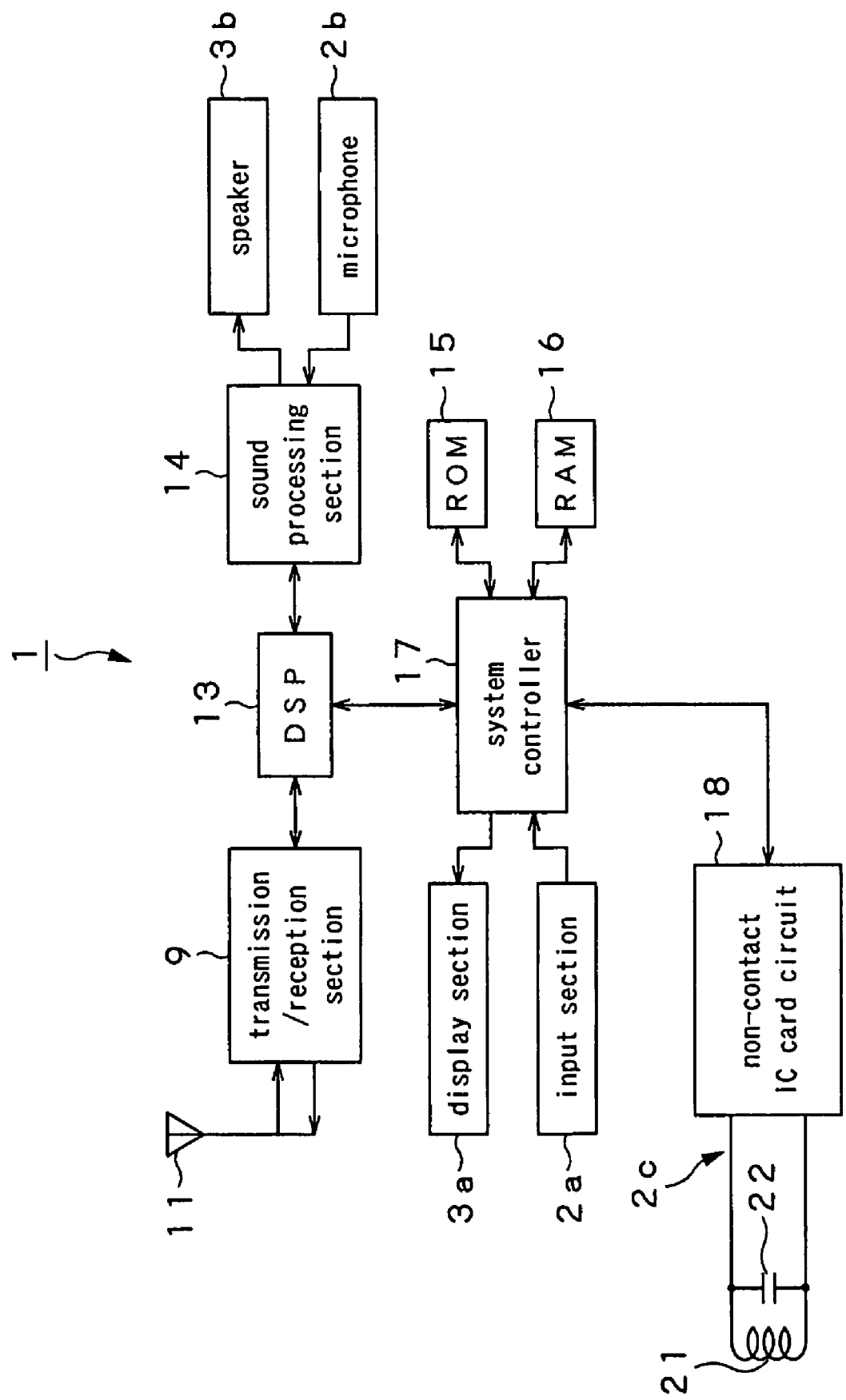
FIG. 2 is a schematic block diagram of the portable telephone set of FIG. 1.

Now, the circuit configuration of the above described portable type telephone set 1 will be described below with reference to FIG. 2. The portable type telephone set 1 includes a transmission/reception section 12 connected to a communication antenna 11 to communicate with a base station, a DSP (digital signal processor) 13 connected to the transmission/reception section 12 to modulate/demodulate signals for voice communications and signal communications, a sound processing section 14 for transforming the digital signal of sound data received at the time of communication into an analog signal and outputting it to the speaker 3b and also transforming the analog signal of sound data input from the microphone 2b into a digital signal, a ROM (Read Only Memory) 15 storing a control program and so on and, a RAM (Random Access Memory) 16 into which the control program and so on stored in the ROM 15 are loaded and a system controller 17 for controlling the entire operation of the portable type telephone set 1.

At the time of signal transmission, the transmission/reception section 12 performs a processing operation of frequency conversion on the sound data input from the DSP 13 and transmits the sound data obtained as a result of the processing operation to the base station by way of the communication antenna 11. At the time of signal reception, the transmission/reception section 12 amplifies the RF signal received by way of the communication antenna 8 and performs a processing operation of frequency conversion on the RF signal and outputs the obtained data to the DSP 13. For instance, the transmission/reception section 12 is adapted to communications conforming to the PDC (Personal Digital Cellular) System, the IMT (International Mobile Telecommunication)-2000 System, the DS-CDMA (Direct Spread Code Division Multiple Access) System or the like.

The DSP 13 decodes the sound data that are typically subjected to spread spectrum and input from the transmission/reception section 12 and outputs the decoded sound data to the speaker 3b. At the time of signal transmission, the DSP 13 performs an operation of spread spectrum on the sound data input from the DSP 13 and outputs the sound data to the transmission/reception section 12. At the time of data communication, the DSP 13 outputs the decoded data to the system controller 17 and encodes the data input from the system controller 17.

The sound processing section 14 transforms the electric analog signal that corresponds to the user's voice collected by the microphone 2b into a digital signal and outputs it to the DSP 13. The sound processing section 14 also transforms the digital signal of the sound data input from the DSP 13 into an analog signal and outputs it to the speaker 3c.

The system controller 17 loads the program read out from the ROM 15 according to the operation signal that is input from the input section 2a in the RAM 16, performs a necessary operation on it and outputs information on the situation of the operation to the display section 3a. The system controller 17 also outputs control data and the like to the DSP 13.

The system controller 17 is also connected to an RFID section 2c. Specifically, the RFID section 2c has a non-contact type IC card circuit 18 on which data are written and from which data are read by an external reader/writer.

Figure 3:
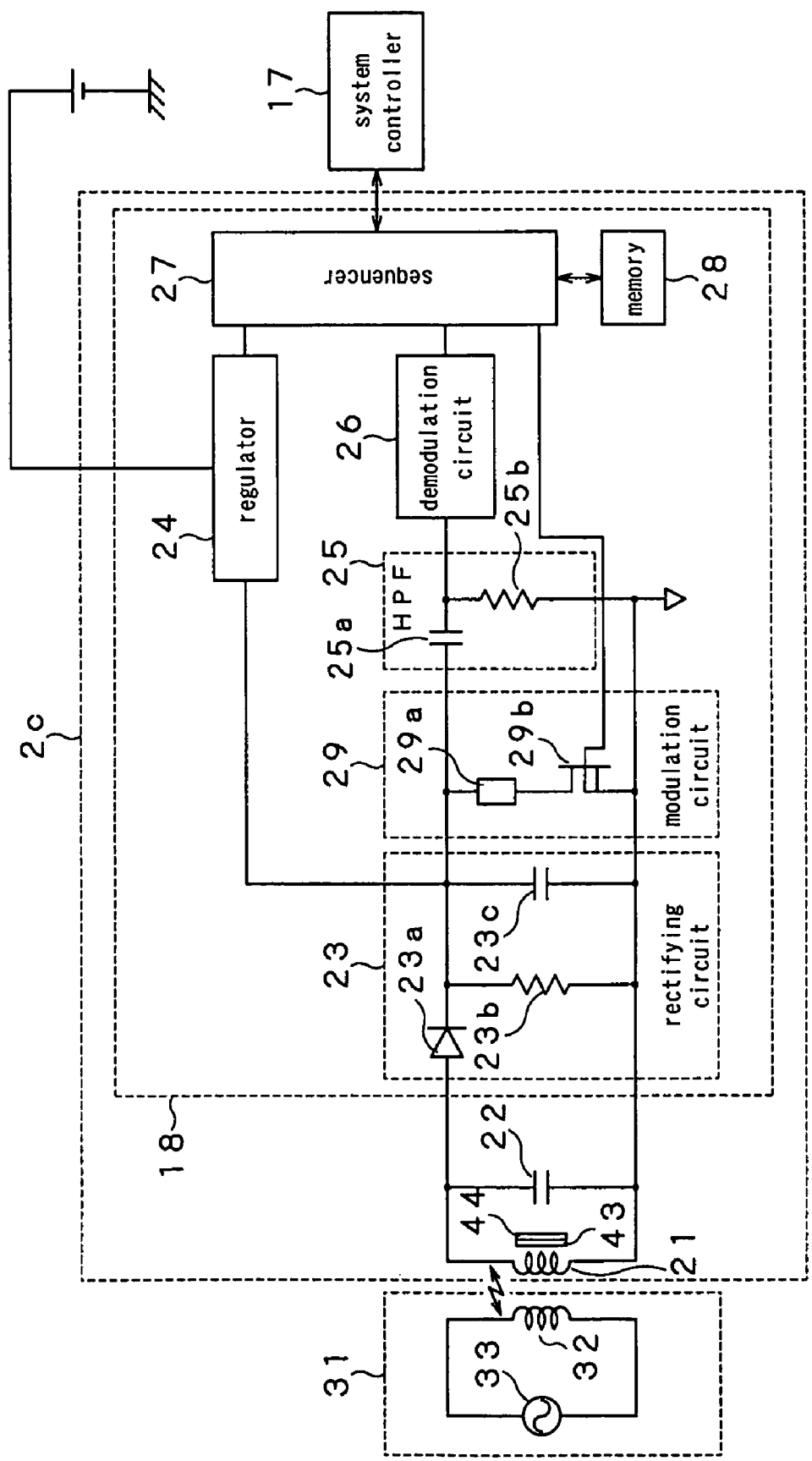
FIG. 3 is a schematic circuit diagram of an RFID section.

As shown in FIG. 3, the RFID section 2c has an antenna coil 21 formed by flatly winding a conductor wire in order to communicate with the reader/writer and a capacitor 22 connected in parallel with the antenna coil 21 so that the antenna coil 21 and the capacitor 22 form a parallel resonance circuit. Data are transmitted and received as the antenna coil of the external reader/writer and the antenna coil 21 are coupled to each other by inductive coupling. More specifically, since the antenna coil 21 is a loop antenna, it radiates an electromagnetic wave to the outside as the electric current flowing through the closed loop changes. Likewise, as the density of the magnetic flux passing through the closed loop is changed by an electromagnetic wave or a magnetic field applied to it externally, the density of the magnetic flux passing through the closed loop changes and an electric current flows through the closed loop as a function of the intensity of the electromagnetic wave or the magnetic field.

The non-contact type IC card circuit 18 includes a rectifying circuit 23 for rectifying and smoothing the electric signal supplied from the antenna coil 21, a regulator 24 for generating a DC voltage, an HPF (High-Pass Filter) 25 for extracting a high frequency component of the electric signal output from the rectifying circuit 23, a demodulation circuit 26 for demodulating the high frequency component signal input from the HPF 25, a sequencer 27 for controlling the operation of writing or reading data according to the data supplied from the demodulation circuit 26, a memory 28 for storing the data supplied from the demodulation circuit 26 and a modulation circuit 29 for modulating the data to be transmitted.

The rectifying circuit 23 includes a diode 23a, a resistor 23b and a capacitor 23c. The diode 23a has its anode terminal connected to an end of the capacitor 22 and the antenna coil 21, and its cathode terminal connected to an end of the resistor 23b and the capacitor 23c. The other end of the resistor 23b and the capacitor 23c is connected to the other end of the capacitor 22 and the antenna coil 21. The rectifying circuit 23 rectifies and smoothes the electric signal supplied from the antenna coil 21 and outputs it to the regulator 24 and the HPF 25.

The regulator 24 generates a DC voltage. More specifically, the regulator 24 generates a DC voltage from the energy of the output signal of the rectifying circuit 23 or from the energy of an external power source, which may be the battery pack 4. Then, the regulator 24 supplies the DC voltage to the electric circuit of the sequencer 27.

The HPF 25 has a capacitor 25a and a resistor 25b. The HPF 25 extracts, or detects, a high frequency component of the electric signal supplied from the rectifying circuit 23 and outputs it to the demodulation circuit 26. The demodulation circuit 26 is connected to an end of the capacitor 25a of the HPF 25 and to the other end of the resistor 25b. The demodulation circuit 2b demodulates the signal of the high frequency component input from the HPF 25 and outputs it to the sequencer 26. More specifically, the demodulation circuit 21 demodulates the data modulated via Manchester codes, a modified mirror, a NRZ (Non Return to Zero) technique or the like.

The sequencer 27 includes a ROM, RAM or the like and is connected to the demodulation circuit 26. The sequencer 27 executes a program stored in the ROM according to the command input from the demodulation circuit 26 and reads out data stored in the memory 28 based on the executed program, or it writes data supplied from the demodulation circuit 26 into the memory 28. For example, the sequencer 27 modulates the data to be transmitted that is read out from the memory 28 via Manchester codes, a modified mirror, an NRZ technique or the like and transmits it to the modulation circuit 29.

The memory 28 is a non-volatile memory such as an EEPROM (Electrically Erasable Programmable Read-Only Memory) that does not require any electric power for holding data and connected to the sequencer 27. The memory 28 stores the data supplied from the demodulation circuit 26 according to the command from the sequencer 27.

The modulation circuit 29 is a series circuit of an impedance 29a and an FET (Field Effect Transistor) 29b. An end of the impedance 29a is connected to the cathode terminal of the diode 23a of the rectifying circuit 23 and the other end of the impedance 29a is connected to the drain terminal of the FET 29b, while the source terminal of the FET 29b is grounded and the gate terminal of the FET 29b is connected to the sequencer 27. The modulation circuit 29 is connected in parallel with the antenna coil 21 of the resonance circuit so that the load of the antenna coil 21 is made to fluctuate as the FET 29b is subjected to a switching operation according to the data that is transmitted from the sequencer 27 and modulated via Manchester codes, a modified mirror, an NRZ technique, or the like, at the sequencer 27.

Figure 4:
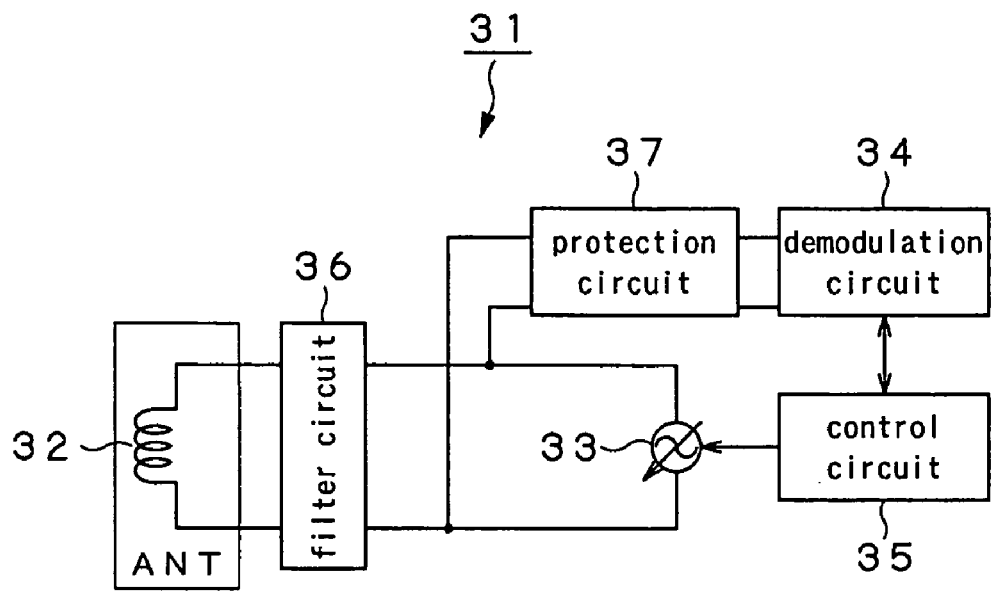
FIG. 4 is a schematic block diagram of a reader/writer.

As shown in FIG. 4, the external reader/writer that communicates with the above-described RFID section 2c has a reader/writer circuit 31. The reader/writer circuit 31 includes an antenna coil 32 formed by flatly winding a conductor wire in order to communicate with the RFID section 2c. The antenna coil 32 is a loop antenna that is paired with the antenna 21 to communicate with the RFID section 2c. Data are transmitted and received as the antenna coil 32 of the external reader/writer and the antenna coil 21 are coupled to each other by inductive coupling. More specifically, since the antenna coil 32 is a loop antenna, it radiates an electromagnetic wave to the outside as the electric current flowing through the closed loop changes. Likewise, as the density of the magnetic flux passing through the closed loop is changed by an electromagnetic wave or a magnetic field applied to it externally, the density of the magnetic flux passing through the closed loop changes and an electric current flows through the closed loop as a function of the intensity of the electromagnetic wave or the magnetic field. Note that a capacitor may be connected to the antenna coil 32 in parallel or in series for the purpose of resonance depending on the antenna drive circuit system of the reader/writer circuit 31.

The reader/writer circuit 31 further includes a modulation circuit 33 for modulating data, a demodulation circuit 34 for demodulating data and a control circuit 35 for controlling the operation of signal transmission and signal reception. The modulation circuit 33 modulates and outputs the data to be transmitted that is input from the control circuit 35. The demodulation circuit 34 demodulates the modulated wave from the antenna coil 32 and outputs the received and demodulated data to the control circuit 35. A protection circuit 37 is arranged between the demodulation circuit 34 and the filter circuit 36 for detecting the data transmitted from the RFID section 2c to attenuate the input signal if the input signal is a large signal. The control circuit 35 generates various control commands according to the program stored in the ROM to control the modulation circuit 33 and the demodulation circuit 34. It also generates data to be transmitted according to the commands and supplies the data to the modulation circuit 33.

Figure 5:
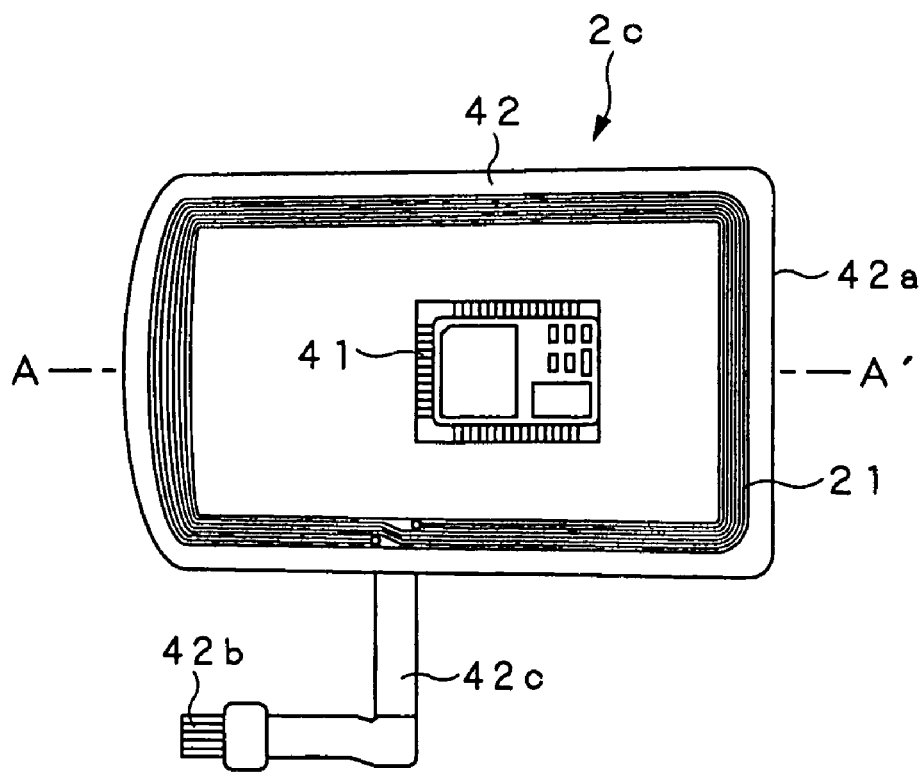
FIG. 5 is a schematic plan view of the flexible substrate of the RFID section.
Figure 6:
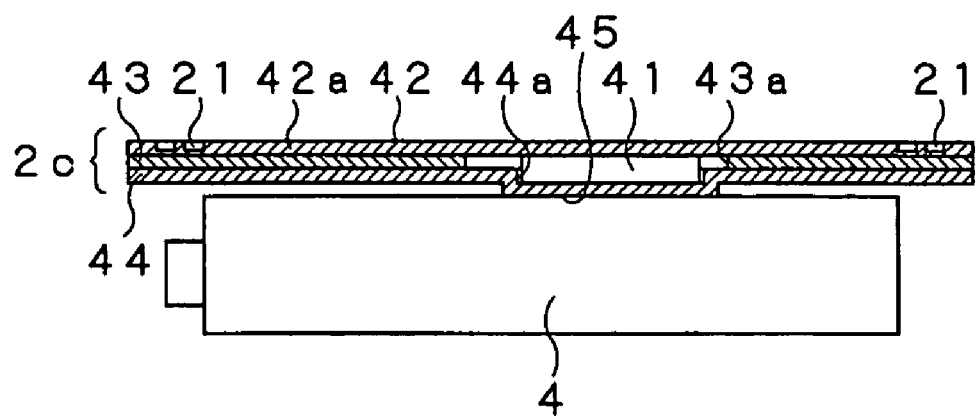
FIG. 6 is a schematic cross sectional view of the RFID section.
Figure 8:
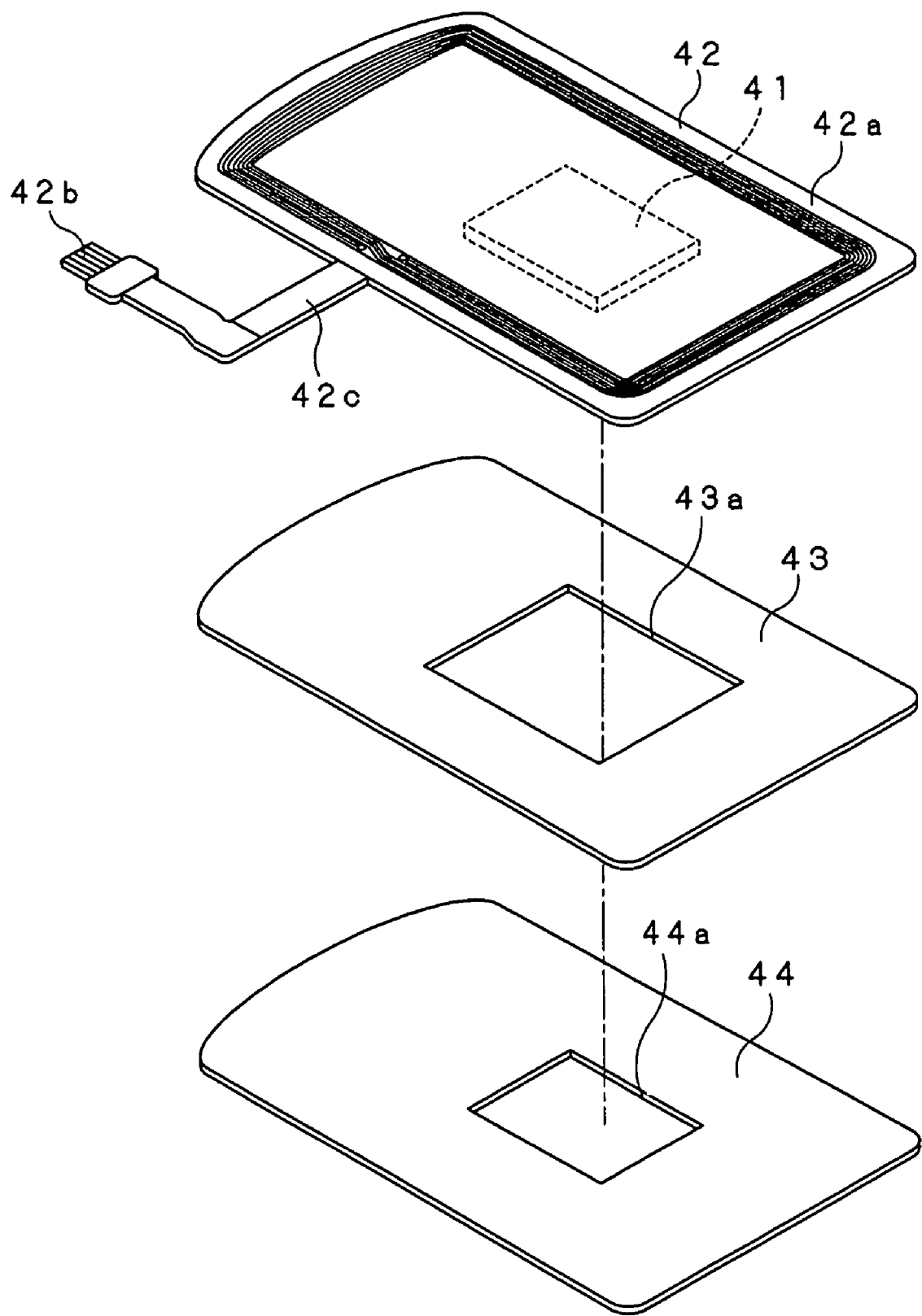
FIG. 8 is an exploded schematic perspective view of the RFID section.

Meanwhile, as shown in FIGS. 5, 6 and 8, the RFID section 2c that is arranged on one of the main surfaces of the portable type telephone set 1 at the rear side thereof is located on the battery pack 4. When the main surface is made to face upward, a magnetic plate 43 is laid under the substrate 42 under which the antenna coil 21 and the signal processing integrated circuit element 41 are also arranged and the metal plate 44 is laid under the magnetic plate 43.

The substrate 42 is formed on one of the main surfaces of the portable type telephone set 1 where the looped antenna coil 21 is arranged by forming an electrically conductive pattern of copper in a flexible and electrically-insulating substrate section 42a that is typically made of polyimide or mica. Of course, the substrate 42 alternatively may be a rigid substrate. Although not shown, a land is formed in the inside of the antenna coil 21 on the other surface of the substrate 42 in order to mount the signal processing integrated circuit element 41 thereat. A technique of printing an electrically conductive pattern by using electrically conductive paste such as silver paste or a technique of forming an electrically conductive pattern by sputtering a metal target on the substrate alternatively may be used instead of the above-described technique.

The signal processing integrated circuit element 41 that is mounted on the substrate 42 includes the electric circuits of the RFID section 2c other than the antenna coil 21 or the capacitor 22, the rectifying circuit 23, the regulator 24, the HPF 25, the demodulation circuit 26, the sequencer 27, the memory 28, the modulation circuit 29 and so on. The electric circuits of the signal processing integrated circuit element 41 are electrically connected to the antenna coil 21 by way of an electrically conductive pattern that is linked to the antenna coil 21.

The substrate 42 is provided with a flexible connector 42c for connecting it to the corresponding one of the electric circuits of the portable telephone set 1 and a terminal section 42b is formed at the front end thereof. The terminal section 42b is electrically connected to the corresponding one of the electric circuits of the telephone set 1, which is typically the system controller 17.

Figure 7:
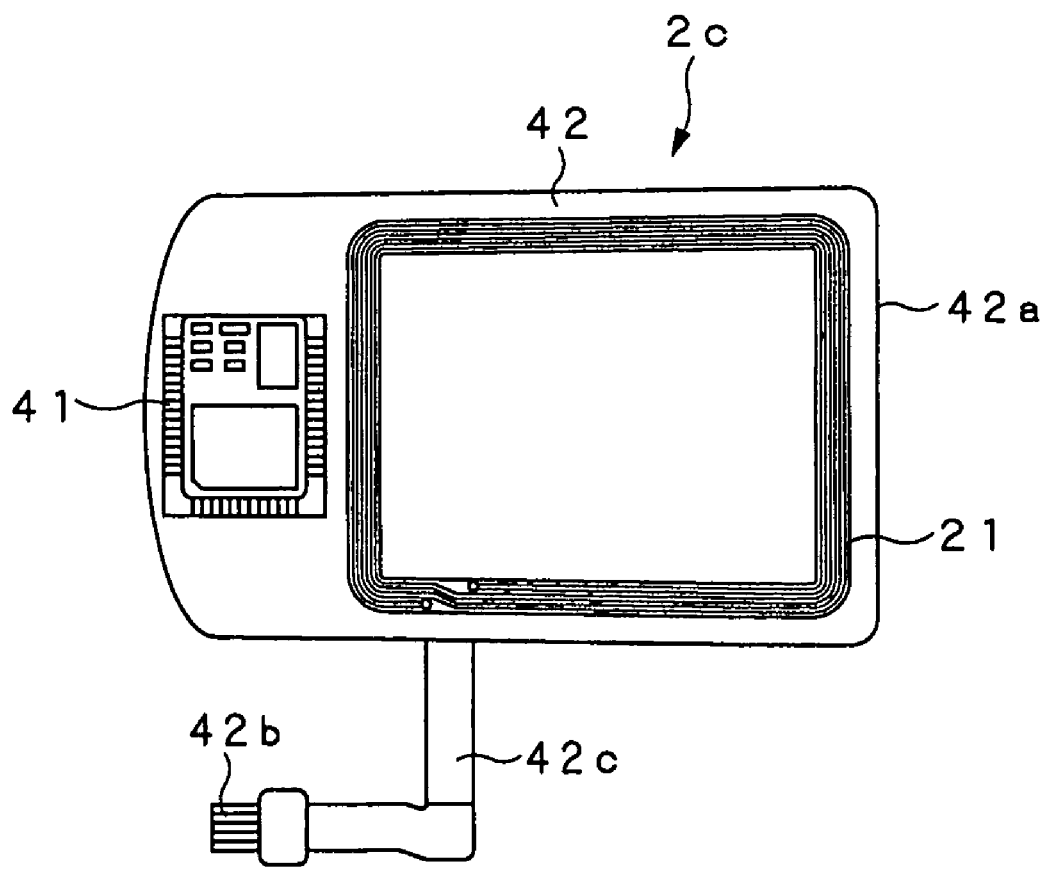
FIG. 7 is a schematic plan view of the signal processing integrated circuit element of the portable telephone set of FIG. 1, showing an alternative arrangement thereof.

As pointed out above, a land is arranged in the inside of the antenna coil 21 that is formed substantially along the outer periphery thereof and the signal processing integrated circuit element 41 is mounted thereat that it is possible to reduce the distance and, thus, the loss/resistance between the antenna coil 21 and the signal processing integrated circuit element 41 and improve the anti-external-noise performance of the portable telephone set 1. The signal processing integrated circuit element 41 may be arranged outside and near the antenna coil 21 as shown in FIG. 7 instead of inside of the latter to achieve similar effects.

Figure 10:
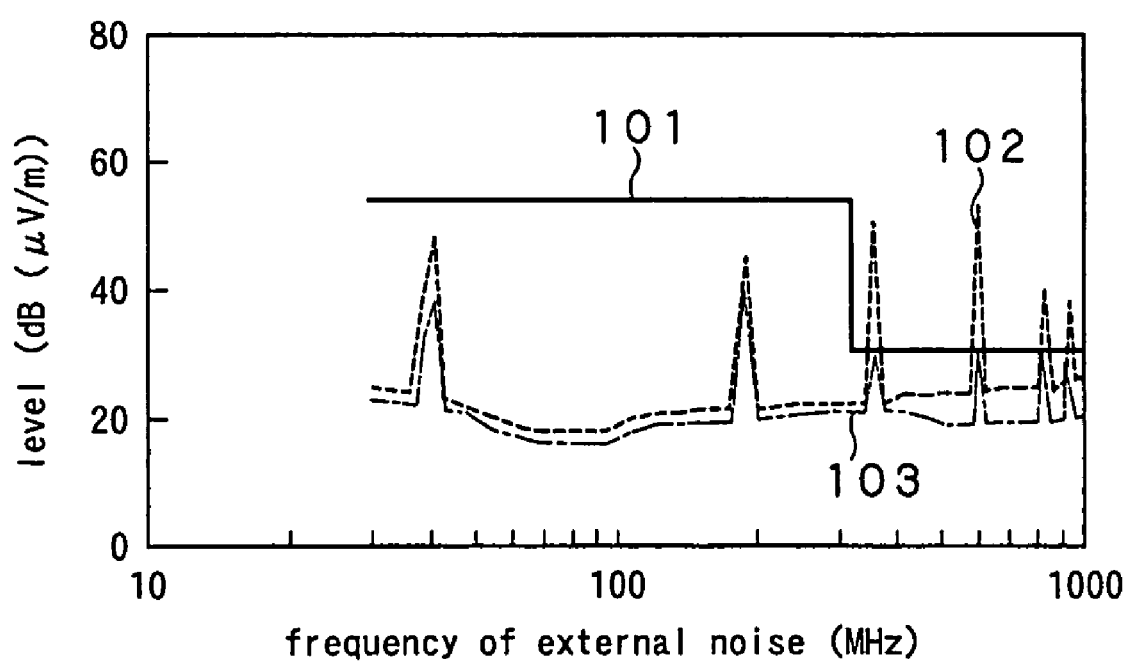
FIG. 10 is a graph illustrating the relationship between the frequencies and the level of external noise.

FIG. 10 is a graph illustrating the relationship between the frequencies and the level of external noise. In FIG. 10, line 101 indicates the permissible level of external noise and line 102 indicates the anti-external noise performance of a similar portable telephone set 1 when the signal processing integrated circuit element 41 is mounted on the substrate of the portable telephone set 1 and, hence, the antenna coil 21 and the signal processing integrated circuit element 41 are separated from each other, whereas line 103 indicates the anti-external noise performance of the portable telephone set 1 achieved through application of the present invention where the signal processing integrated circuit element 41 is mounted in the inside of the antenna coil 21 and, hence, the distance between the antenna coil 21 and the signal processing integrated circuit element 41 is made short. The line 102 that is shown for the purpose of comparison is located higher than the line 103 of the present invention. Additionally, it goes above the line 101 representing the permissible level in the frequency range beyond 300 MHz. On the other hand, the line 103 of the present invention is entirely found below the line 101 representing the permissible level. Thus, as a result of arranging the signal processing integrated circuit element 41 in the inside of or near the antenna coil 21 to reduce the distance between the antenna coil 21 and the signal processing integrated circuit element 41 in the RFID section 2c, the anti-external-noise performance of the portable telephone set 1 is improved to increase the communication distance.

Figure 11:
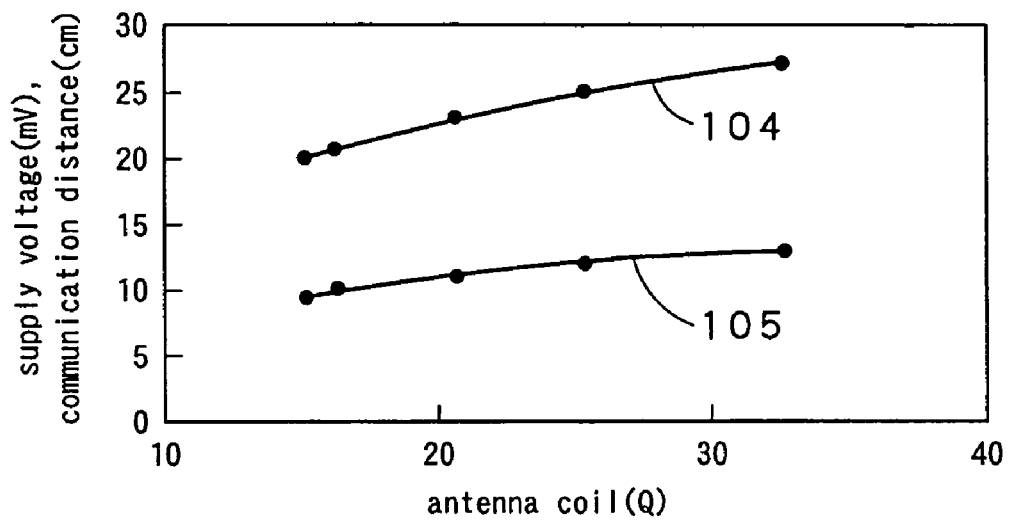
FIG. 11 is a graph illustrating the relationship among the Q value of the antenna coil, the supply voltage to the signal processing integrated circuit element and the communication distance.

Additionally, as a result of arranging the signal processing integrated circuit element 41 in the inside of or near the antenna coil 21 in the RFID section 2c, the loss/resistance between the antenna coil 21 and the signal processing integrated circuit element 41 is reduced. Therefore, the antenna coil 21 shows a large Q value. FIG. 11 is a graph illustrating the relationship among the Q value of the antenna coil 21, the supply voltage to the signal processing integrated circuit element 41 and the communication distance. In FIG. 11, line 104 indicates the supply voltage and line 105 indicates the communication distance. It is clear from FIG. 11 that, as the Q value of the antenna coil 21 increases, the supply voltage rises in turn to increase the communication distance.

As shown in FIGS. 6 and 8, a magnetic plate 43 is arranged under the substrate 42 in order to minimize the influence of the metal parts located in the vicinity. One or more than one printed circuit board and a large number of electronic parts are arranged in the cabinet of the portable telephone set 1 as metal parts and the substrate 42 is also arranged in the cabinet of the portable telephone set 1 that contains those metal parts. Thus, the magnetic field of the antenna coil 32 of the reader/writer invades those metal parts of the antenna coil 21 to generate eddy currents in them to reduce the magnetic field of the antenna coil 32 of the reader/writer. Then, it is no longer possible for the RFID section 2c to secure the card voltage necessary for communication. Additionally, the magnetic field generated by the antenna coil 21 also affects the circuits of the portable telephone set 1. As the magnetic plate 43 is laid under the substrate 42 on which the antenna coil 21 is arranged, it controls propagation of the magnetic field and operates as a magnetic shield to reduce the influence of the magnetic field on the metal parts located in the vicinity.

More specifically, the magnetic plate 43 needs to cover at least a region of the substrate 42 in which the antenna coil 21 is arranged. Additionally, it should allow the signal processing integrated circuit element 41 mounted on the other surface of the substrate 42 to escape. Therefore, the magnetic plate 43 is provided with an aperture 43a as shown in FIGS. 6 and 8 to allow the signal processing integrated circuit element 41 to escape through it. The magnetic plate 43 having the aperture 43a is preferably made as wide as possible in order to minimize the influence of the metal parts in the vicinity.

The magnetic plate 43 is typically made of a magnetic material such as an Fe—Si—Al type material, an Fe—Si type material or a ferrite type material and secured in position by resin. It typically shows $\mu'>30$ and $\mu''<20$ when the resonance frequency is 13.56 MHz. The material characteristics of the magnetic plate 43 will be described in greater detail hereinafter.

As shown in FIGS. 6 and 8, a metal plate 44 is arranged under the magnetic plate 43 to substantially regulate the resonance frequency of the antenna coil. As pointed out above, as the antenna coil 21 is subjected to an AC magnetic field with metal parts arranged in the vicinity, the apparent inductance of the entire system including the antenna coil 21 and the virtual coils in the metal parts arranged in the vicinity is reduced to raise the resonance frequency. Therefore, the metal plate 44 is laid under the magnetic plate 43 in order to roughly regulate the resonance frequency of the antenna coil 21. Additionally, the metal plate 44 operates as strength-boosting plate once it is laid under the magnetic plate 43. Note that the resonance frequency of the antenna coil 21 is typically 13.56 MH The resonance frequency of the antenna coil 21 can be finely regulated by arranging an LC resonance circuit in the signal processing integrated circuit element 41 to regulate and lower the resonance frequency or by altering the positions of the metal parts arranged in the vicinity.

The metal plate 44 is typically made of a non-magnetic material such as stainless steel. However, a magnetic plate of a material showing a high electric conductivity such as Permalloy or an amorphous material alternatively may be used for it. When a magnetic plate showing a high electric conductivity is used for the metal plate 44, it not only may substantially regulate the resonance frequency but also operate like the magnetic plate 43 to enhance the electrostatic shield effect.

The metal plate 44 as described above is laid under the magnetic plate 43 having an aperture 43a for allowing the signal processing integrated circuit element 41 to escape through it. Thus, it is mounted on the substrate 42 and provided with a recess 44a for allowing the signal processing integrated circuit element 41 that is exposed through the aperture 43a of the magnetic plate 43 to escape.

Figure 12:
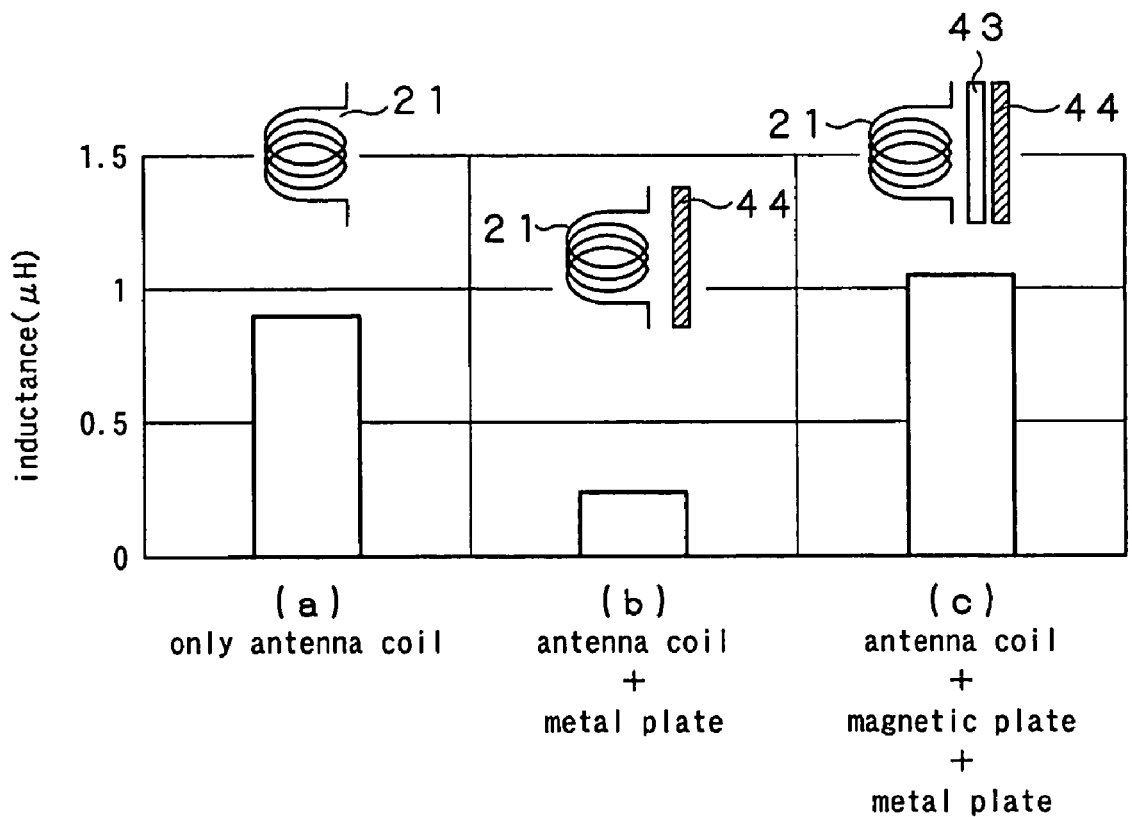
FIG. 12 is a schematic illustration of the influence of metal on inductance.

FIG. 12 is a schematic illustration of the influence of metal on inductance. In FIG. 12, (a) shows the inductance when the antenna coil 21 is not provided with the magnetic plate 43 and the metal plate 44 and (b) shows the inductance when the antenna coil 21 is provided only with the metal plate 44, while (c) shows the inductance when the antenna coil 21 is provided with both the magnetic plate 43 and the metal plate 44 that are laid one on the other according to the present invention. In the case of (b), the metal plate 44 that is laid under the antenna coil 21 may be regarded as the battery pack 4 that is arranged further below. In the instance of (b), where the metal plate 44 is laid under the antenna coil 21 and the battery pack 4 is arranged further below, the magnetic field enters the metal plate 44 and the metal frame of the battery pack 4 and the apparent inductance of the entire system of the antenna coil 21 and the metal parts in the vicinity is reduced. To the contrary, in the instance of (c), where the magnetic plate 43 and the metal plate 44 are sequentially laid under the antenna coil 21, the inductance is raised due to the magnetic plate 43 showing a high magnetic permeability. Therefore, in the instance of (c) of the portable telephone set 1 achieved via applying the present invention, it is possible to prevent the electromagnetically induced electromotive force from lowering and, thus, increase the communication distance.

The RFID section 2c having the above described configuration is integrally formed into an RFID module as the antenna coil 21 is arranged on one of the main surface of the portable telephone set 1 while the substrate 42 is arranged on the other main surface and the magnetic plate 43 and the metal plate 44 are sequentially bonded thereto via an adhesive agent as shown in FIG. 6. In other words, the RFID module is fitted to the predetermined position in the cabinet of the portable telephone set 1, or the upper side of the battery receiving section 2e, via the adhesive agent 45.

When the above described RFID section 2c communicates with an external reader/writer, one of the main surfaces of the equipment main body 2 of the portable telephone set 1 is brought close to the transmission/reception section of the reader/writer at the rear side thereof. In other words, the RFID section 2c contained in the portable telephone set 1 is brought close to the transmission/reception section of the reader/writer. As the RFID section 2c and the transmission/reception section of the reader/writer come close to each other, the antenna coil 21 of the RFID section 2c is magnetically coupled to the antenna coil of the transmission/reception section of the reader/writer by inductive coupling.

Then, as the antenna coil 21 detects the magnetic field or the electromagnetic wave being propagated from the transmission/reception section of the external reader/writer, an electric current, or an electric signal, that reflects the intensity of the electromagnetic wave or the magnetic field is supplied to the rectifying circuit 23. Then, the rectifying circuit 23 rectifies the electric signal from the antenna coil 21 and supplies a positive level voltage to the regulator 24 and the HPF 25. The positive level voltage supplied from the rectifying circuit 23 to the regulator 24 is stabilized thereat and transformed into a DC voltage of a predetermined level, which is then supplied to the related components as power for driving the internal circuits. The HPF 25 extracts a high frequency component and the demodulation circuit 26 demodulates the signal supplied from the HPF 25 and supplies the signal obtained as a result of demodulation to the sequencer 27. The sequencer 27 analyses the signal input from the demodulation circuit 26 and, if it is a write command, it writes the demodulated data into the memory 28.

If, on the other hand, the signal input from the demodulation circuit 26 is a read command, the sequence 27 reads the data to be transmitted that corresponds to the command from the memory 28. The modulation circuit 29 modulates the data to be transmitted by conducting a switching operation on the FET 29b to fluctuate the load of the antenna coil 21. As a result, the transmission/reception section of the reader/writer detects an electric current whose intensity corresponds to the intensity of the electromagnetic wave or the magnetic field and reads the data transmitted from the RFID section 2c Additionally, the sequencer 27 of the RFID section 2c is also connected to the system controller 17 in the portable telephone set 1. Therefore, the memory 28 of the RFID section 2c can read any of the data stored in the memory 28 and write data into the memory 28 according to the command from the system controller 17. If the memory 28 stores data on the amount of money that is charged to a user, the system controller 17 can read the balance stored in the memory 28. and rewrite the balance in the memory after paying for the charge and settling the transaction.

As described above, it is possible to downsize the RFID section 2c by arranging the signal processing integrated circuit element 41 in the inside or near the antenna coil 21 of the substrate 42 in the portable telephone set 1. Additionally, it is possible to reduce the thickness of the RFID section 2c by sequentially laying the magnetic plate 43 and the metal plate 44 under the substrate 42 as integral parts thereof. In short, the equipment main body 2 can be downsized and its thickness can be reduced. Additionally, the mechanical strength of the substrate 42 is improved as the magnetic plate 43 and the metal plate 44 are integrated therewith. Furthermore, it is possible to reduce the distance and, hence, the loss/resistance between the antenna coil 21 and the signal processing integrated circuit element 41 and improve the anti-external-noise performance of the portable telephone set 1 by mounting the signal processing integrated circuit element 41 in the inside or near the substrate 42. Additionally, as the magnetic plate 43 is laid under the substrate 42 on which the antenna coil 21 is arranged, it controls propagation of the magnetic field and operates as a magnetic shield to reduce the influence of the magnetic field on the metal parts located in the vicinity. While the RFID section 2c is arranged above the battery pack 4 that is a metal part, it is possible to substantially regulate the resonance frequency of the antenna coil 21 due to the metal plate 44 that is arranged between the battery pack 4 and the magnetic plate 43.

Figure 9:
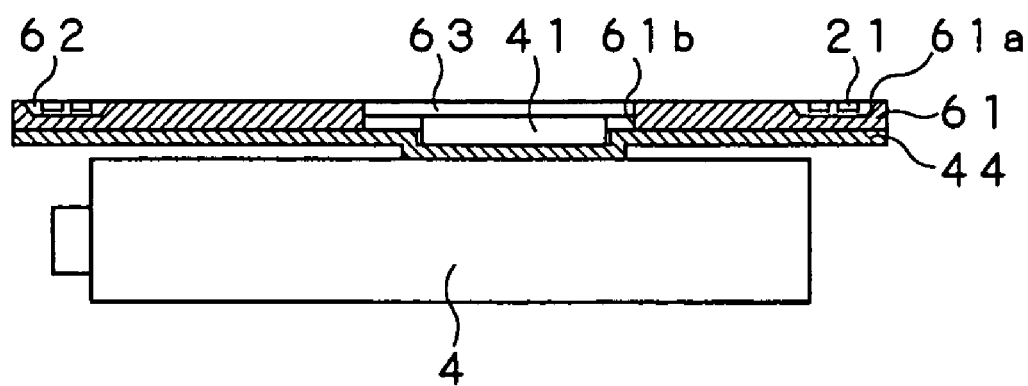
FIG. 9 is a schematic cross sectional view of the RFID section obtained by modifying the original one.

While the RFID section 2c is formed by sequentially laying the magnetic plate 43 and the metal plate 44 on the substrate 42 on which the antenna coil 21 is arranged and the signal processing integrated circuit element 41 is mounted in order to integrate them in the description given above by referring to FIG. 6, it alternatively may be configured in a manner as illustrated in FIG. 9. In the instance of FIG. 9, a magnetic plate 61 having a central aperture 61b is provided with a fitting recess 61a to be used for fitting a substrate 62 having an aperture and carrying the antenna coil 21 thereon and another substrate 63 on which the signal processing integrated circuit element 41 is mounted is arranged in the central aperture 61b. With this arrangement, the RFID section provides advantages similar to those of the RFID section 2c illustrated in FIG. 6

An experiment was conducted for materials that can be used for the above-described magnetic plate 43 carrying the antenna coil 21. This is be described below.

The following samples were used for the magnetic plate 43.

Sample A: Fe(73)-Si(16)-Al(10)+binder (nylon or polyethylene)

Sample B: Fe(73)-Si(16)-Al(10)+binder

Sample C: Fe(78)-Si(20)-Cr(2)+binder (the unit in the parentheses being atom %)

Figure 13:
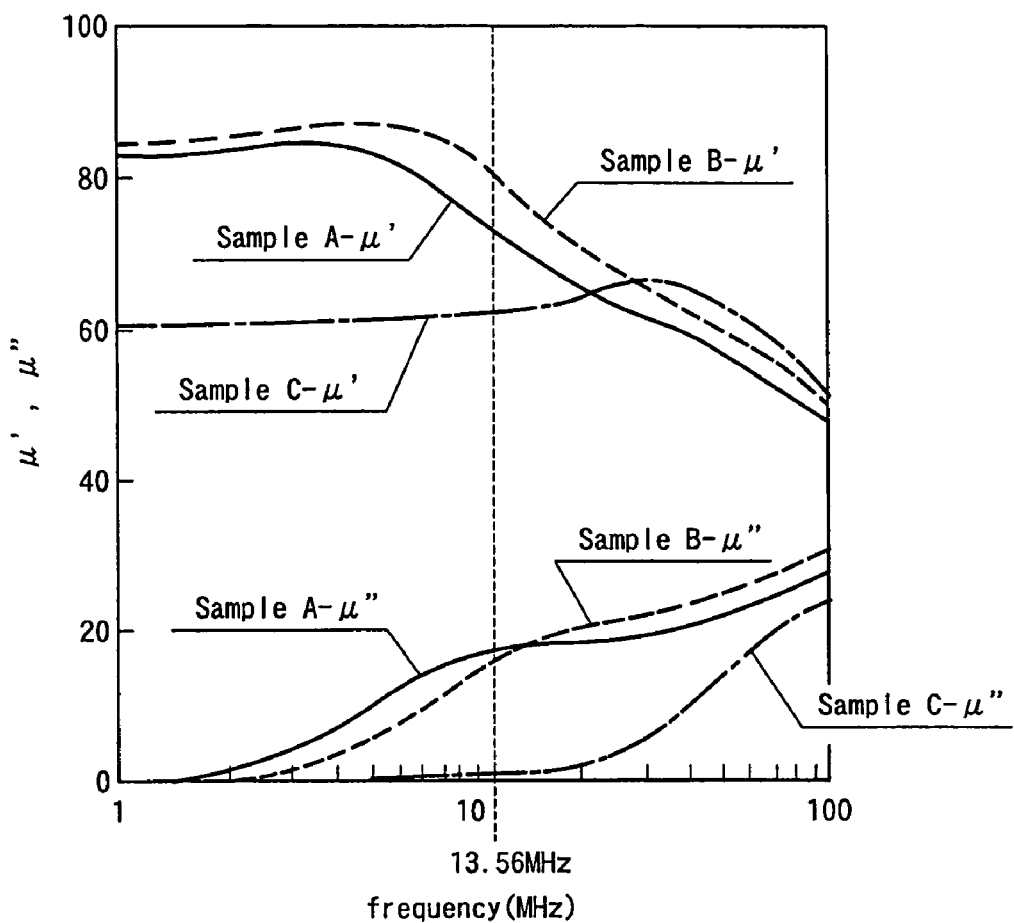
FIG. 13 is a graph illustrating the relationship between the frequency and the magnetic permeability.

FIG. 13 is a graph illustrating the relationship between the frequency and the magnetic permeability. In FIG. 13, $\mu'$ represents the real number part of the magnetic permeability $\mu$(=B (intensity of magnetic field)/H (magnetic flux density) or the part of B that follows and in phase with the change of H and $\mu''$ represents the magnetic permeability showing the ratio of B that follows the change of H with a phase delay of 90°. In other words, $\mu''$ represents the energy loss.

The resonance frequency of the antenna coil 21 is 13.56 MHz as described above. Then, $\mu'$ and $\mu''$ of Samples A through C are as follows.

Sample A: $\mu'$=65, $\mu''$=13

Sample B: $\mu'$=77, $\mu''$=17

Sample C: $\mu'$=55, $\mu''$=2.2

Hence, Sample C shows the lowest energy loss $\mu''$.

Figure 14:
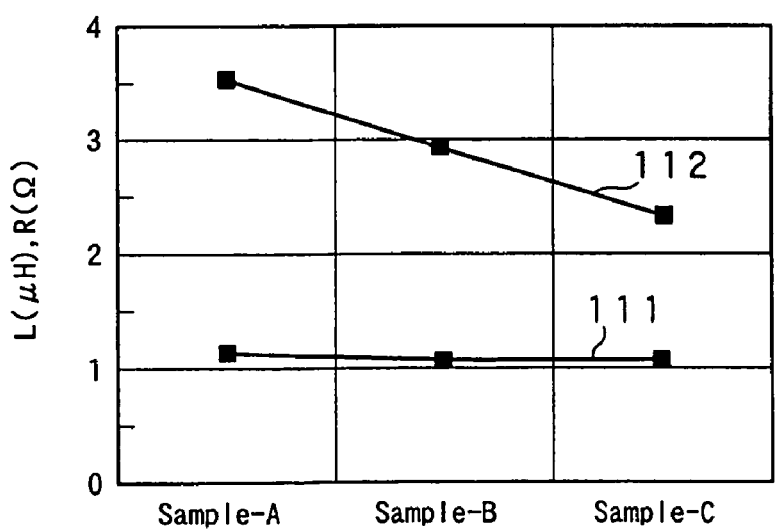
FIG. 14 is a graph illustrating the resistances (R), the inductances (L) and the Q values of Samples A through C.

FIG. 14 is a graph illustrating the resistances (R) and the inductances (L) of Samples A through C. In FIG. 14, line 111 indicates the inductances (L) while line 112 indicates the losses/resistances (R). As shown in FIG. 14, while all the samples show substantially the same inductance (L), their losses/resistances (R) falls in the order of Sample A, Sample B and Sample C.

Figure 15:
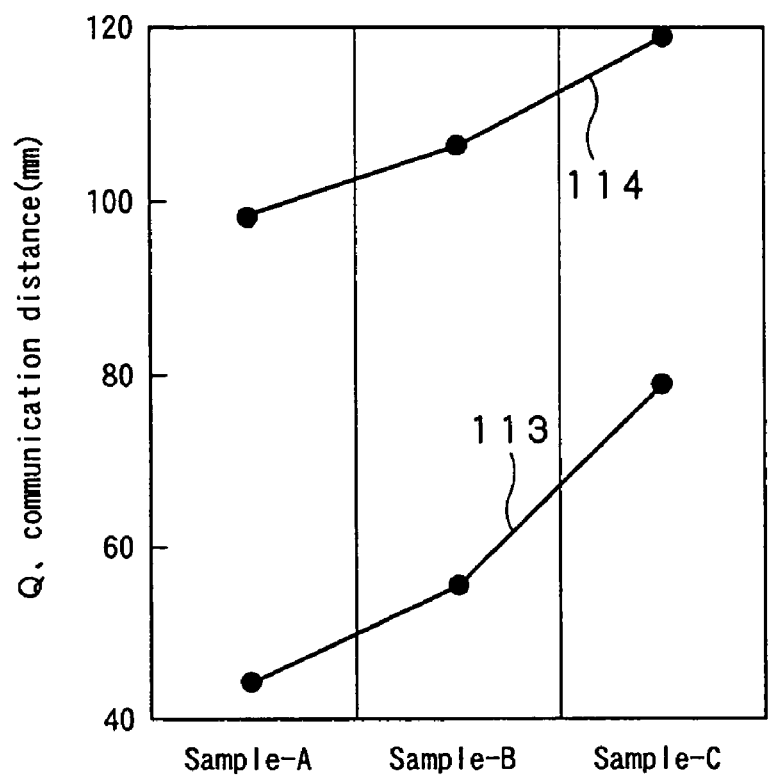
FIG. 15 is a graph illustrating the relationship between the Q values of Samples A through C and their communication distances.

FIG. 15 is a graph illustrating the relationship between the Q values of Samples A through C and the communication distances. In FIG. 15, line 113 indicates the Q values of Samples A through C, while line 114 indicates the communication distances of Samples A through C. The Q values rises in the order of Sample A, Sample B and Sample C. In other words, as seen from FIGS. 14 and 15, the loss/resistance (R) and the Q value show a relationship that the Q value rises as the resistance (R) falls. Therefore, the communication distances increase in the order of Sample A, Sample B and Sample C.

From the above description, it will be seen that Sample C shows the lowest value for $\mu''$ provides the longest communication distance out of Samples A through C and that a magnetic plate 43 whose $\mu''$ value is low in the resonance frequency and can provide a long communication distance.

Figure 16:
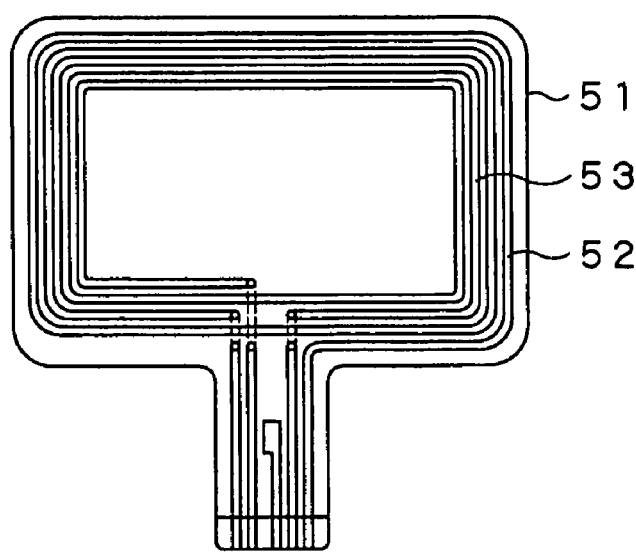
FIG. 16 is a schematic plan view of a substrate on which the antenna of a reader/writer circuit is arranged inside the antenna coil of a non-contact type IC card, showing an arrangement other than that of FIG. 1.

The RFID section 2c arranged at the rear side of one of the main surfaces of the equipment main body 2 of the above described portable telephone set 1 additionally may be provided with a reader/writer circuit. Then, as shown in FIG. 16, the substrate 42 is replaced by substrate 51 on which a first antenna coil 52 that replaces the antenna coil 21 of the RFID section 2c and a second antenna coil 53 that replaces the antenna coil 32 of the reader/writer circuit 31 are arranged. Concretely, the first antenna coil 52 for the card is arranged in the outer circumferential side and the second antenna coil 53 for the reader/writer circuit is arranged in the inside. In other words, the first antenna coil 52 and the second antenna coil 53 are arranged close to each other on the same surface to downsize the antenna module.

Figure 17:
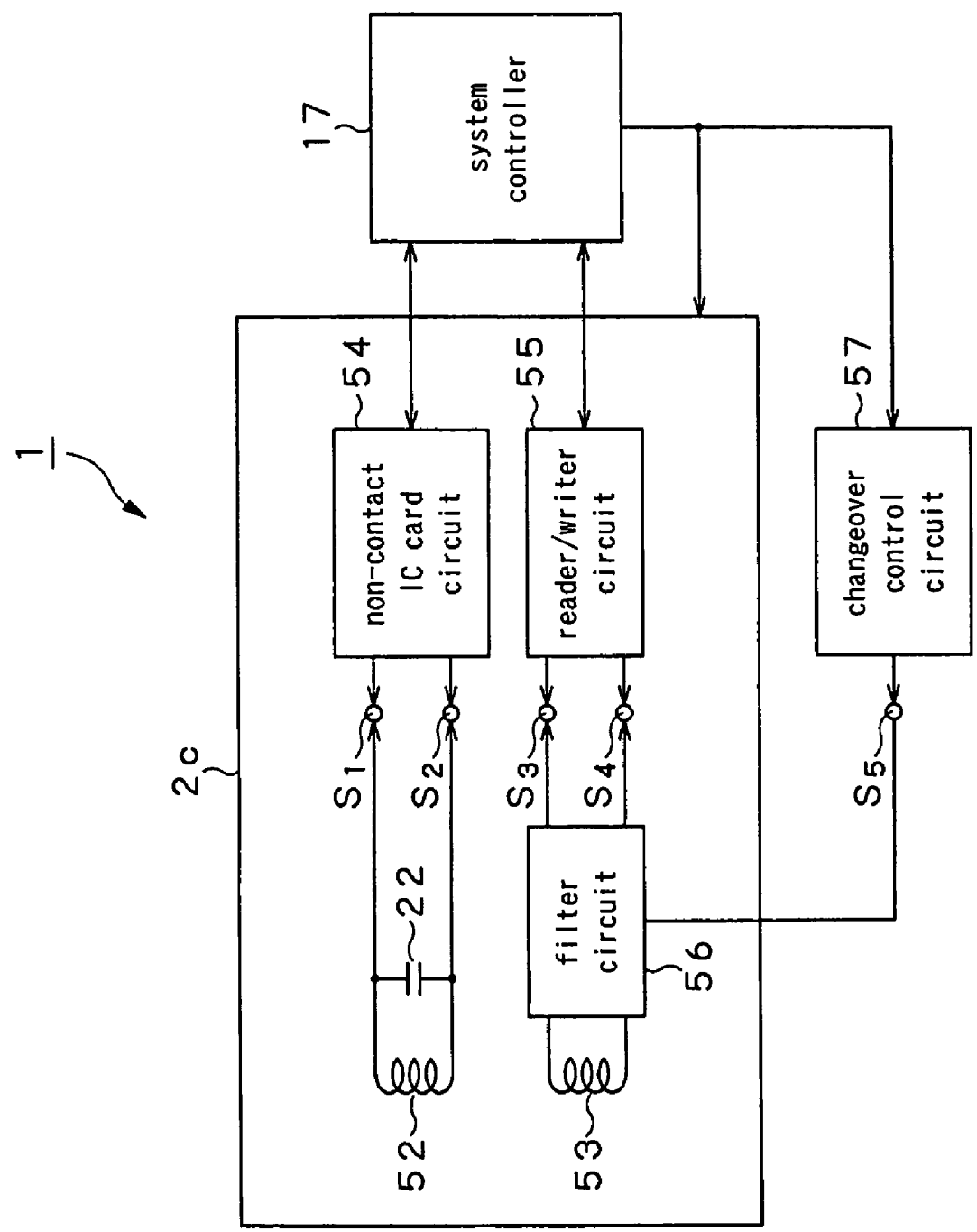
FIG. 17 is a schematic block diagram of the non-contact type IC card circuit connected to the antenna of the reader/writer circuit arranged in the inside of the antenna coil of a non-contact type IC card and the reader/writer circuit.

As shown in FIG. 17, a non-contact type IC card circuit 54 is arranged on the first antenna coil 52 and a reader/writer circuit 55 is connected to the second antenna coil 53 in the RFID section 2c. Since the non-contact type IC card circuit 54 has a circuit configuration similar to the one illustrated in FIG. 3, it will not be described here any further. Similarly, since the reader/writer circuit 55 has a circuit configuration similar to that of the reader/writer circuit 31 shown in FIG. 4, it will not be described here any further either.

A filter circuit 56 is arranged between the reader/writer circuit 55 and the second antenna coil 53. The filter circuit 56 is driven by the reader/writer circuit 55 and suppresses the signal emitted from the second antenna coil 54 to a predetermined signal level. The filter circuit 56 includes low pass filters and band pass filters that are inserted therein, if necessary, in order to secure the communication quality of the portable telephone set 1 and reduce any spurious emission of transmission wave, or so-called unnecessary radiation, to make the portable telephone set 1 conform to the radio laws of different nations.

Figure 18:
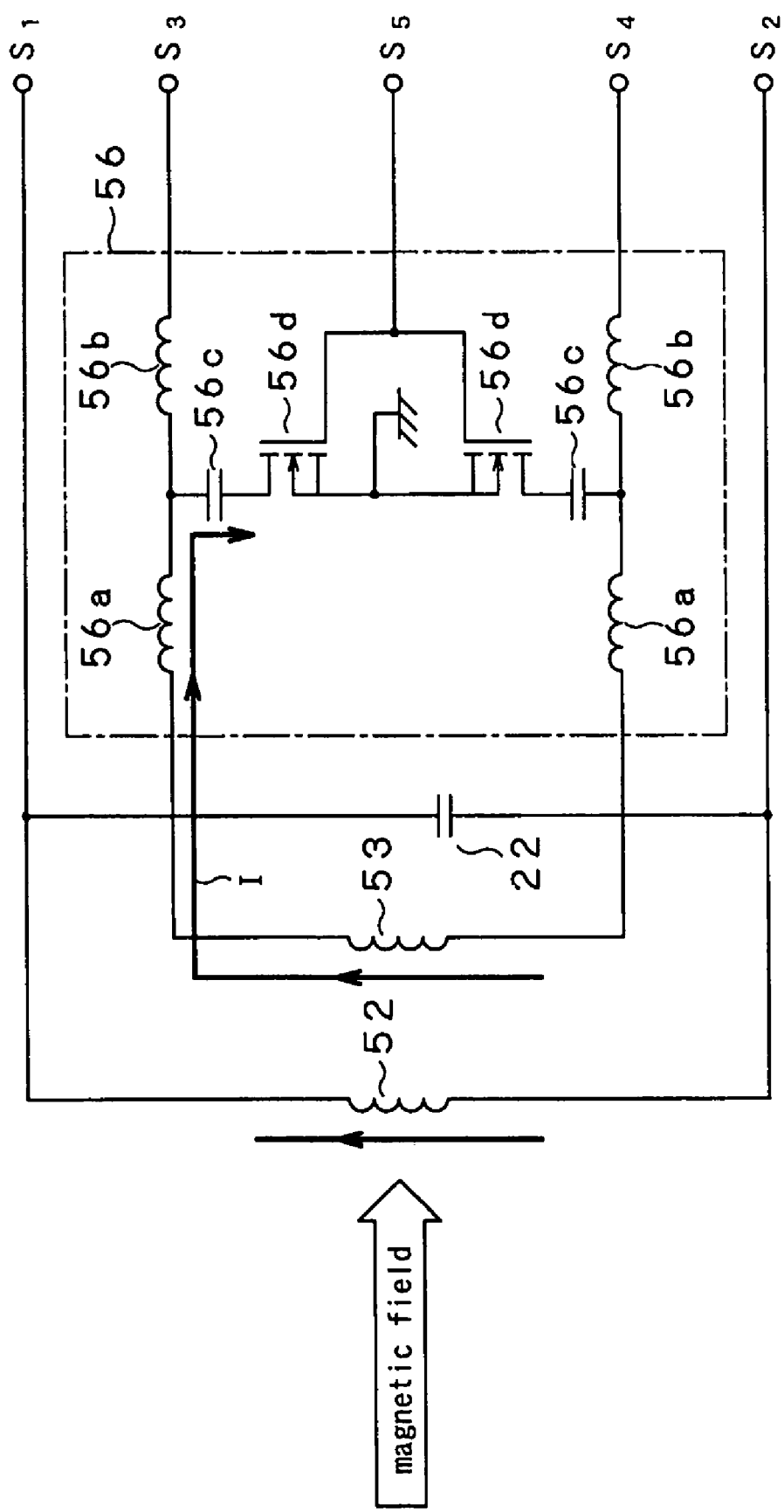
FIG. 18 is a circuit diagram of a filter circuit.

More specifically, as shown in FIG. 18, the filter circuit 56 has a pair of low pass filters on the respective transmission lines between the reader/writer circuit 55 and the second antenna coil 53. The low pass filters are so-called T-type tertiary low pass filters, each of which includes a pair of coils 56a, 56b and a capacitor 56c. More specifically, a low pass filter is inserted in one of the transmission lines and configured in such a way that one of the coils, or the coil 56a, is connected at an end thereof to an end of the second antenna coil 53 and at the other end thereof to an end of the other coil 56b while the other end of the other coil 56b is connected to connection terminal S3 and the capacitor 56c is connected at an end thereof between the pair of coils 56a, 56b and at the other end to the ground. Similarly, another low pass filter is inserted on the other transmission line and configured in such a way that one of the coils, or the coil 56a, is connected at an end thereof to an end of the second antenna coil 53 and at the other end thereof to an end of the other coil 56b while the other end of the other coil 56b is connected to connection terminal S4 and the capacitor 56c is connected at an end thereof between the pair of coils 56a, 56b and at the other end to the ground.

Additionally, the filter circuit 56 is provided with a changeover switch 56d adapted to suppress the operation of the filter circuit 56 when the non-contact type IC card circuit 54 communicates with an external reader/writer and formed by using an MOS (complementary Metal Oxide Semiconductor) type FET (Field Effect Transistor). The changeover switch 56d has its gate connected to an output terminal S5 of changeover control circuit 57, which will be described in greater detail hereinafter, its drain connected to the other end of the capacitor 56c and its source connected to a grounding point.

A changeover control circuit 57 for turning on and off the changeover switch 56d, which is inserted in the filter circuit 56, is arranged between the system controller 17 and the filter circuit 56. The changeover control circuit 57 turns on and off the changeover switch 56d, which is inserted in the filter circuit 56, according to the control signal supplied from the system controller 17 to the RFID section 2c. More specifically, the changeover control circuit 57 turns off the changeover switch 56d when the non-contact type IC card circuit 54 is driven for use, whereas it turns on the changeover switch 56d when the reader/writer circuit 55 is driven for use.

When the portable telephone set 1 is used as a non-contact type IC card, the first antenna coil 52 receives the electromagnetic wave transmitted from the external reader/writer and the non-contact type IC card circuit 54 is driven to operate by the power induced by the first antenna coil 52. At this time, power is induced by the electromagnetic wave transmitted from the external reader/writer both in the first antenna coil 52 of the non-contact type IC card circuit 54 and the second antenna coil 53 of the reader/writer circuit 55. Therefore, the electric current I that is inducted in the second antenna coil 53 flows through the coil 31 and the capacitor 56c of the filter circuit 56 but is blocked by the changeover switch 56d that is turned off. In other words, when the non-contact type IC card circuit 54 of the portable telephone set 1 communicates with the external reader/writer, the changeover switch 56d that is inserted in the filter circuit 56 is turned off to raise the impedance of the capacitor 56c infinitely and, consequently, to increase the overall impedance as viewed from the first antenna coil 52 so as to make the filter circuit 56 not constitute any load.

As a result, as the non-contact type IC card circuit 54 of the portable type telephone set 1 communicates with the external reader/writer and becomes driven to operate, the electric power induced in the second antenna coil 53 by the electromagnetic wave transmitted from the external reader/writer being prevented from flowing to ground by way of the coil 56a and the capacitor 56c of the filter circuit 56. In other words, in the portable type telephone set 1, the electric power inducted in the second antenna coil 53 is not consumed and substantially all the electric power inducted by the electromagnetic wave transmitted from the external reader/writer can be used in the non-contact type IC card circuit 54.

Thus, practically no power loss arises in the portable type telephone set 1, wherein it is possible to secure a sufficient communication distance between the non-contact type IC card circuit 54 of the portable type telephone set 1 and the external reader/writer so that the entire telephone set can be downsized without increasing the dimensions of the first antenna coil 52 of the non-contact type IC card.

On the other hand, when the reader/writer circuit 55 is driven to operate and communicate with an external non-contact type IC card 102, the changeover switch 56d inserted in the filter circuit 56 is turned on. Then, it is possible to secure the performance of the filter circuit 56 by selecting a device whose switch-on resistance is sufficiently small. Since the changeover switch 56d is not inserted directly in the signal line, it is possible to prevent the waveform passing through the changeover switch 56d from degrading and a loss of electric power from arising.

As described above in detail, advantages of the present invention are secured due to the provision of the magnetic plate 43 and the metal plate 44 arranged under the substrate 51 even when the RFID section 2c is provided with a non-contact type IC card circuit 54 and a reader/writer circuit 55 and the first antenna coil 52 and the second antenna coil 53 are arranged close to each other on the substrate 51.

While the RFID section 2c is arranged above the battery pack 4 in the above description, the position of the RFID section 2c is not particularly restricted so long as the antenna coil is, or antenna coils are, located on the inner surface side of the cabinet. In view of that many metal parts are arranged in the cabinet of the portable type telephone set 1 at positions other than on the battery pack 4 as pointed out, advantages of the present invention are secured even when the RFID section 2c is arranged on a printed circuit board.

While the present invention is applied to a portable type telephone set 1 in the above description, the scope of application of the present invention is by no means limited to portable type telephone sets so long as it is a portable type device. Thus, the present invention can be applied to PDAs and portable type recording and/or reproduction devices that are adapted to use a disc cartridge or an IC card as recording medium.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A portable-type information processing terminal device, comprising:
   a substrate carrying a substantially annular antenna coil thereon;
   a signal processing integrated circuit element arranged in an inside of the antenna coil;
   an annular magnetic plate arranged on the substrate which includes an aperture for allowing the signal processing integrated circuit element to escape; and
   a metal plate arranged on the magnetic plate;
   wherein the substrate, the magnetic plate and the metal plate are integrally-formed and arranged in a cabinet.

2. A portable-type information processing terminal device according to claim 1, wherein the metal plate includes a recess corresponding to the aperture of the magnetic plate for allowing the signal processing integrated circuit element to escape.

3. A portable-type information processing terminal device according to claim 1, wherein the magnetic plate is arranged under the antenna coil.

4. A portable-type information processing terminal device according to claim 3, wherein the metal plate is arranged under the magnetic plate.

5. A portable-type information processing terminal device according to claim 4, wherein a metal frame of a battery is arranged under the metal plate to increase an inductance of the antenna coil.

6. A portable-type information processing terminal device according to claim 1, wherein an antenna coil of a non-contact type IC card and an antenna coil of a reader/writer circuit are arranged close to each other on the substrate.

* * * * *